UNITED STATES PATENT OFFICE.

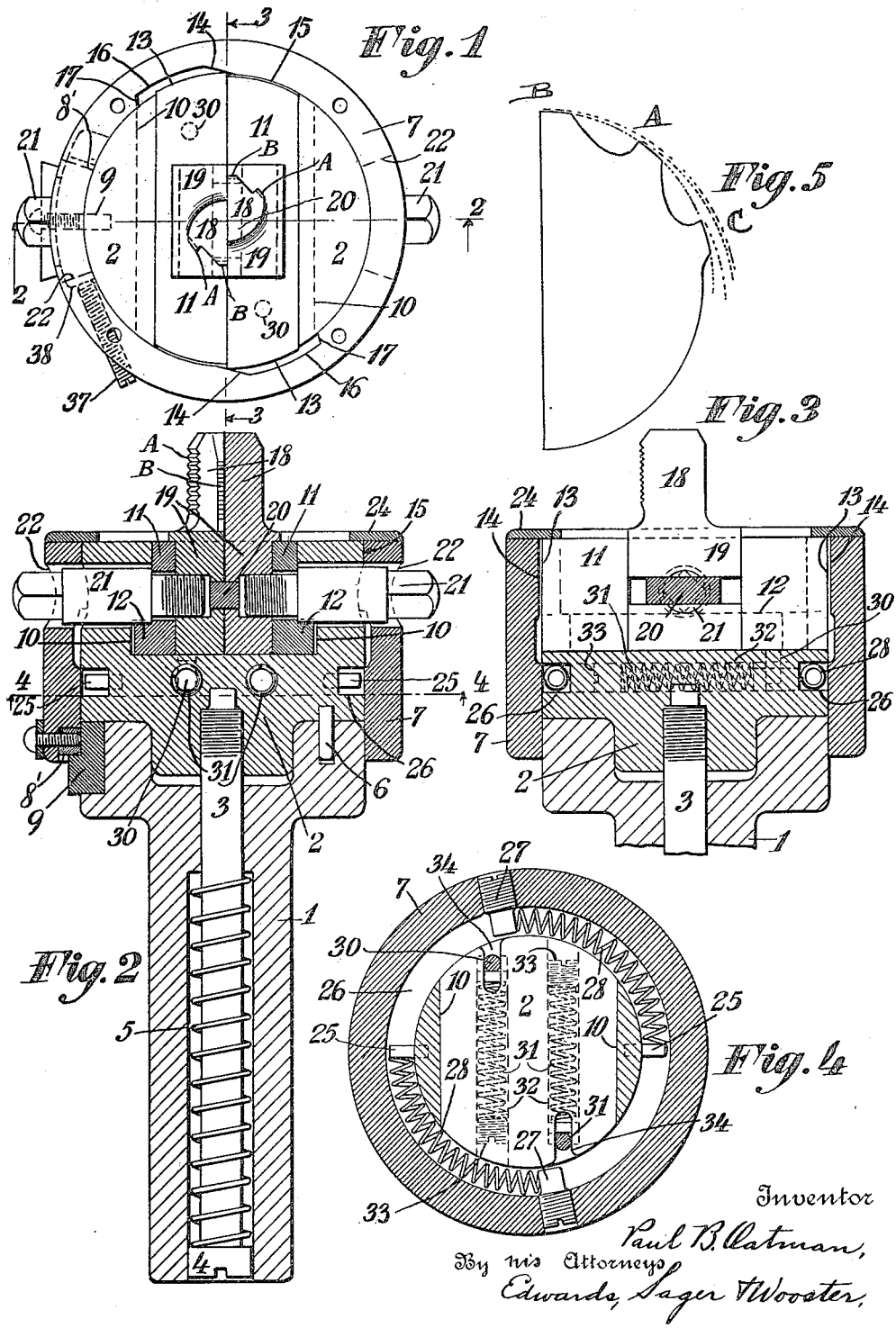

PAUL B. OATMAN, OF ERIE, PENNSYLVANIA.

COLLAPSIBLE TAP OR REAMER.

1,224,494.

Specification of Letters Patent.

Patented May 1, 1917.

Application filed June 24, 1915. Serial No. 36,005.

*To all whom it may concern:*

Be it known that I, PAUL B. OATMAN, a citizen of the United States, residing at Erie, in the county of Erie and State of Pennsylvania, have invented certain new and useful Improvements in Collapsible Taps or Reamers, of which the following is a full, clear, and exact specification.

This invention relates to collapsible taps or reamers and has particular reference to a novel form of tap or reamer cutter and mounting therefor, whereby cuts can be made either at, above, or below a predetermined standard diameter, and whereby in the case of a tap, when the desired depth has been cut, the tool can be quickly collapsed so as to clear the threads and permit quick withdrawal. In the case of a reamer, the invention is useful for reaming holes of varying diameters.

According to this invention, a collapsible and adjustable tap is made of two halves, each carrying one or more sets of cutting teeth, these halves being slidable in opposite directions past each other and being held in predetermined relation for cutting, and being slidable in the reverse direction toward each other to collapse, thereby enabling the thread already cut to be cleared when the tap is withdrawn, without danger of damaging the cut threads.

The invention further consists in the construction and mounting of lapping tool sections upon slides whereby the tool sections are rigidly held during the cutting operation, and yet can be easily controlled to be adjusted, set and collapsed by a shifting cam mechanism controlling the slides. Preferably, and as herein illustrated, the tap automatically collapses when a clutch is released and a cam rotates, and the tap is expanded and automatically locked when the clutch is reëngaged.

A further feature of the invention resides in the interchangeability of cutters for different diameters or numbers of threads, so that one stock can accommodate a variety of sizes of cutters, and thereby a much greater range of diameters is possible than with tools of this character heretofore devised.

A further feature of the invention consists in the particular construction of the tap or reamer cutters, whereby the same cutters operate effectively, whether the slides are set for the standard diameter or more or less than the standard diameter. This object is attained by forming the cutting edges of each cutter, whether one, two, three or more, of different lengths, so that these cutting edges become effective in succession. That is to say, the cutting edge which cuts the smallest or roughing cut is first effective, then the intermediate edge which cuts slightly deeper, and lastly, the finishing edge which cuts the final cut. The latter edges are those whose distance apart is equal to the diameter of the finished cut, and this is an important feature of the invention, as will be more fully understood in connection with the detailed description. In the accompanying drawings, Figure 1 is an end elevation of a tap embodying the invention, showing the parts in operative cutting position.

Fig. 2 is a longitudinal section on the line 2—2 of Fig. 1;

Fig. 3 is a longitudinal section on the line 3—3 of Fig. 1;

Fig. 4 is a transverse section on the line 4—4 of Fig. 2, and Fig. 5 is a diagram showing the relation of the successive cutting edges to each other.

1 represents a stock, which is to be clamped in a chuck or turret head in the usual manner. Mounted on the stock so as to have longitudinal but not rotatable movement, is the head 2, which is attached to the stock 1 by means of a rod 3 provided with head 4 and an interposed expansible spring 5. 6 is a pin carried by the head engaging in a suitable hole in the stock 1 so that when the head moves longitudinally the pin 6 prevents rotation. Rotatably mounted externally of the head 2 is a cam ring 7, which is provided at one side with an adjustable block 8' having a notch 8 which engages a key or clutch pin 9 carried by the stock 1 to lock the cam ring against rotation and hold the cutters in cutting relation. The head 2 is provided with a transverse T-shaped groove or dove-tail slide way 10, in which are mounted two slides 11 having feet 12 sliding in the grooves 10. Each of the slides 11 is provided with curved cam ends 13 which coöperate respectively with the inclined cam surfaces 14 of the cam ring 7. The opposite ends of the slides are curved to coöperate with the inner curved surface 15 of the cam ring 7. The slots 16 in the cam ring 7 are made of such depth as to permit the slides to move oppositely to each other sufficiently to collapse the tap, when the ring is rotated clockwise as in Fig. 1, and to expand the tap when moved in the reverse direction. The shoulders 17 at the ends of the slots 16 constitute stops to limit the rotation of the cam ring 7.

One-half of the cutter is mounted on each of the slides 11, and as shown herein these halves are possessed of like, but reversely arranged cutters 18. In the case of a tap, these cutters are threaded, as shown, while a reamer will simply have the threads omitted and the flutes will cut similarly to an ordinary rigid reamer. These cutter members 18 are provided with bases 19 which are inserted in correspondingly shaped holes cut in the slides 11. Parallel to the slide way 10 a key way is cut in each of cutter member bases 19 to receive a square or other suitably shaped key 20. The slides 11 are also bored to receive bolts 21 which are threaded into the base 19, the bolts 21 passing through slots 22 in the rotatable cam ring 7. By screwing the bolts 21 in the proper direction the amount of play between the sliding faces of the tap members 18 is adjusted so that there will be no looseness, but yet permitting the cutter members to slide past each other in expanding and contracting. 24 is a face ring which is separably secured to the front of the cam ring 7.

The head 2 is provided with pins 25, 25, in a slot 26 and the cam ring is provided with pins 27, 27. Between one of the pins 25 and one of the pins 27 on either side are interposed expansible springs 28, so that when the cam ring 7 is disengaged from the clutch pin 9, springs 28 expand and rotate the cam ring.

In order to move the slides 11 outwardly into the slots 16 to collapse the tool, each slide is preferably provided with a pin 30, which is engaged by a spring 31 contained in transverse holes 32 in the head 2. If desired, the cam and slides can be engaged so as to be moved positively in both directions without springs, in a manner analogous to collapsible dies, such as shown in my Patent No. 1,045,597, dated November 26, 1912. The springs 31 are adjusted in tension by screw plugs 33 in the bores 32. Pins 30 work in slots 34 in the head 2 as seen in Fig. 4.

The cam ring 7 may be rotated and locked by hand, or by a suitable handle, which is not necessary to be shown, it being seen that the spring 5 will retract the head 2, and the associated parts will lock the cam ring 7, as soon as the notch 8 comes opposite the clutch pin 9. This rotation of the cam ring 7 at the same time compresses the springs 28 ready to rotate the cam ring as soon as it is pulled off of the clutch pin 9. The pulling off force will be applied through the head by stopping the feed of the turret, or of the stock as the case may be, but other means for automatically disconnecting and collapsing the tap than that herein shown may be applied.

In order to adjust the diameter above or below the standard, the clutch will ordinarily be closed by engagement of key 9 in notch 8 when the cam surfaces 13 of the slides 11 are at an intermediate point on the inclined cam surface 14 of the cam ring. Thus, by rotating the cam ring clockwise relatively to the slides, the diameter will be reduced, and by rotating the cam ring in the opposite direction, the diameter will be increased. This is accomplished by rotating the cam ring 7 relatively to the head 2, by means of a screw 37 in cam ring 7 engaging with a shoulder 38 on block 8'. Thereby, a slight rotation either way can be given the cam ring 7 to adjust the point of engagement of key 9 with ring 7 and so vary the diameter cut.

In the form shown in Figs. 1, 2 and 3, each tool member 18 is provided with cutting edges A and B. At one diameter, for example at the smallest diameter, the cutting edges A and B should be on approximately the same circle, with only sufficient clearance for proper cutting. At a slightly larger diameter, the edges B come slightly outside the circle of edges A, and if three cutting edges are used on each member, as shown in Fig. 5, the third edge C would be within the circle of the intermediate edge A. Advantage is taken of this, by causing the edges C to commence to cut before the edges A, and causing the edges A to cut before the edges B, which latter make the final cut at the desired diameter. This result is accomplished by having the first cutting thread of cutting edge A higher (or nearer the end of the tap) than the final cutting edge B, and if three cutting edges are employed, the cutting edge C, which would be between the cutting edge A of one cutter and the edge B of the other cutter, would be still higher. Thus the final cutting edge B is the lowest of all, as is seen diagrammatically in Fig. 5, representing three cutting edges on each tool member. Thus, while the final cutting edge B is actually in advance of edge A, as seen in plan view (Fig.

1), or edges A and C where each tap member has three cutting edges, the edge B is below the other edges as seen in elevation (Fig. 2) and is the last to become effective. The same construction is followed for an adjustable reamer. So far as I am aware, this is new in taps or reamers of this character, and has been found in practice to be of very decided advantage, producing smoother threads, with less resistance owing to the simultaneous action of all of the cutting edges, and more evenly distributing the cutting resistance. The number of cutting edges, or flutes may of course be varied according to the intended use. For taps of small diameter, it may only be possible to use two edges on each member, or even one, while on larger sizes more edges can of course be provided. The same applies to a reamer, except that more edges are usually employed than in a tap of the same diameter.

In order to change from one size of tool to another, the cutters and bolts will be disconnected from the slides, and the other size put in. The separate key 20 is more convenient than would be a direct tongue and groove connection between the cutter bases and slides, because more easily assembled and disassembled, but yet being just as effective in preventing relative longitudinal movement between the cutter members.

By this invention, a rigid yet adjustable or collapsible tool is produced which will not get out of order, and in which the sizes can be readily changed without taking the whole tool apart.

While the invention has been described with reference to a preferred form thereof embodied in a tap or reamer, it is to be understood that it is not limited thereto, but may be applied to other similar tools. Various modifications and changes in the detailed construction and arrangement of parts can be made without departing from the scope of the appended claims.

Having thus described my invention, what I declare as new and desire to secure by Letters Patent of the United States is:—

1. A tap or reamer comprising oppositely movable contacting slides each carrying a cutter comprising a base and an axially extending portion having a cutting edge on one side, one cutter partly overlapping the other in a plane through the axis of the tool, and a relatively rotatable cam ring engaging and controlling said slides.

2. In a tap or reamer, the combination with a pair of axially projecting cutters overlapping in a plane through the axis of the tool, of a ring having internal cam surfaces for moving said cutters in opposite directions.

3. A tap or reamer comprising a head, a pair of oppositely movable overlapping slides each interlocked with said head on one end thereof, means slidably interlocking said slides, a cutter on each slide, and a rotary cam ring for controlling the slides.

4. A tap or reamer comprising a stock carrying a relatively longitudinally movable head, oppositely movable slides carried by said head, axially projecting overlapping cutters carried by said slides, and releasable means for adjusting said slides controlled by relative longitudinal and rotary movement between said stock and said head.

5. A tap or reamer comprising a stock, a head longitudinally movable thereon, a pair of lapping slides interlocked with said head and movable transversely thereof, and a rotatable cam ring mounted on said head and releasably engaging said stock, said cam ring having opposite cam surfaces for simultaneously moving said slides in opposite directions.

6. A tap or reamer comprising a stock, a head movable longitudinally of the stock and carrying oppositely movable lapping cutter members, and a cam rotatable relatively to the head upon longitudinal movement of the head for controlling said cutters.

7. A tap or reamer comprising a stock carrying oppositely movable slides, lapping cutter members carried by said slides, and a ring cam surrounding and engaging the ends of said slides for controlling said cutter members.

8. A tap or reamer comprising a stock carrying oppositely movable slides, lapping cutter members carried by said slides, a ring cam surrounding and engaging the ends of said slides and rotatable relatively to the stock for controlling said cutter members, and means for releasably connecting the cam and the stock.

9. A tap or reamer comprising relatively movable lapping cutting members, each member having a plurality of cutting edges at different distances from the axis of the tool.

10. A tap or reamer comprising a rotatable head, oppositely movable cutter members carried by said head, each member carrying a plurality of cutting edges of different lengths and spaced at different distances from the axis of rotation of the tool.

11. A tap or reamer comprising relatively movable lapping cutter members, each member having a plurality of cutting edges of respectively different lengths.

12. A tap or reamer comprising relatively movable lapping cutter members, each member having a finish diameter cutting edge and a roughing diameter cutting edge.

13. A cutter for a tap or reamer comprising a base, and an axially extending cutter portion substantially semicircular in section and having a plurality of longitudinal cutting edges on its periphery.

14. A cutter for a tap or reamer comprising a base, an axially extending cutter portion substantially semicircular in section and having a plurality of longitudinal cutting edges on its periphery, and a flange between said base and said cutter portion.

15. A cutter for a tap or reamer comprising a base, an axially extending cutter portion having a flat face and a curved periphery, and a plurality of cutting edges on said periphery having their outer ends spaced axially of the cutter.

In testimony whereof I affix my signature, in presence of two witnesses.

PAUL B. OATMAN.

Witnesses:
LYLE W. ORR,
W. B. GARDINER.

Copies of this patent may be obtained for five cents each, by addressing the "Commissioner of Patents, Washington, D. C."